Nov. 24, 1931.  C. H. KENNEWEG  1,833,324
TEMPERATURE CONTROL SYSTEM
Filed Dec. 30, 1929
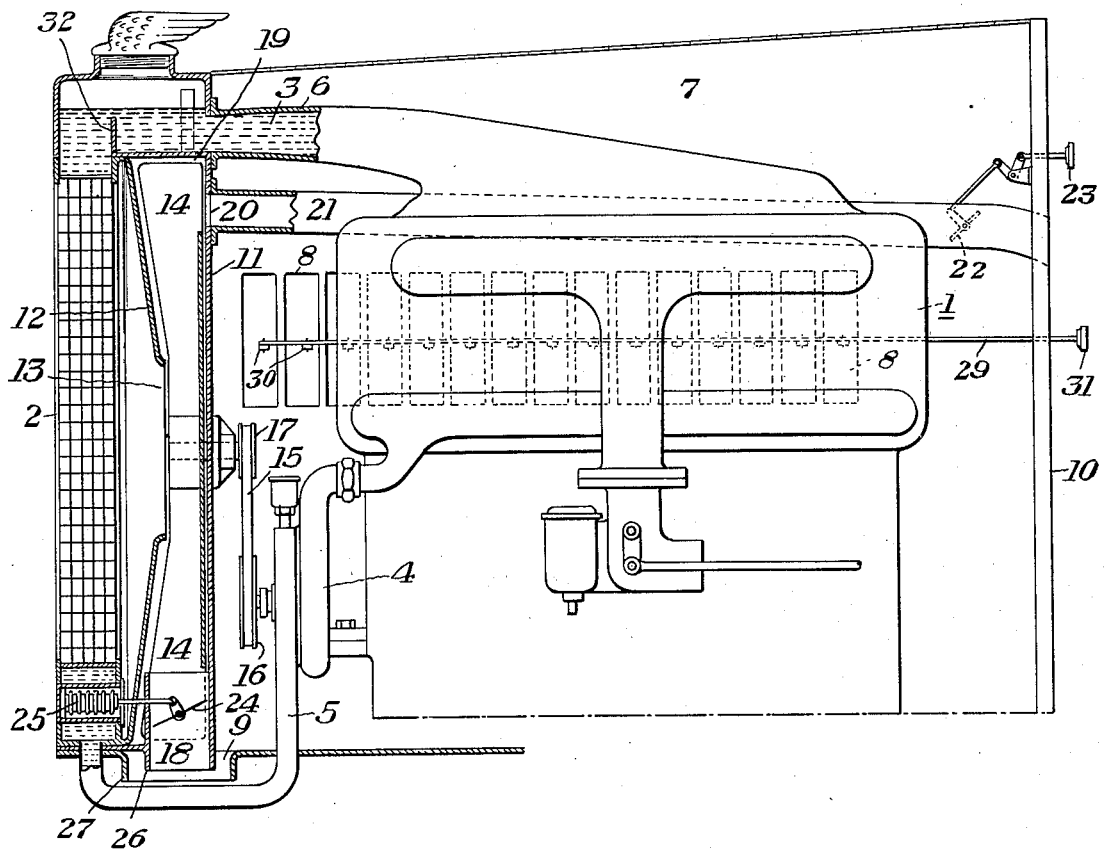
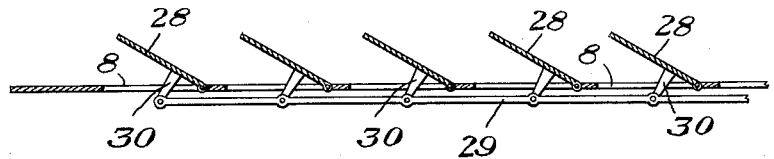
INVENTOR Patented Nov. 24, 1931

1,833,324

UNITED STATES PATENT OFFICE

CHRISTIAN H. KENNEWEG, OF MILLVALE, PENNSYLVANIA

TEMPERATURE CONTROL SYSTEM

Application filed December 30, 1929. Serial No. 417,473.

My invention relates to temperature control systems, and more particularly to temperature control systems for the engines of automotive vehicles.

I provide a temperature control system that is especially adapted for use with automobile and analogous internal combustion engines in which water or other heat-transferring liquid is used to convey excess heat from the engine to a radiator where the excess heat is dissipated or carried away by means of an air stream through sections of the radiator.

In general, I provide improved apparatus and means for maintaining a substantially high average temperature of a liquid-cooled engine under widely varying engine loads and widely varying outside temperature conditions, such, for example, as those caused by normal summer and winter driving or operating conditions and especially lay-over periods wherein slow cooling off of the engine is highly important.

I further provide a substantially dust and dirt proof engine compartment by means of a closed solid partition except as noted hereinafter between the radiating portion of the radiator and the engine compartment, and by exhausting all or nearly all of the air which normally passes through the radiator and thence through an ejecting nozzle, which will be more particularly described hereinafter.

I further provide an efficient and effective car heating apparatus by preventing any air from passing through the radiator until such time as the lower radiator water tank reaches a normally high predetermined temperature, preferably between 175 to 200 degrees Fahrenheit, whereat the thermostat associated with the lower radiator operates and opens a valve in the air outlet or ejecting nozzle, so that thereafter the amount of air is controlled by the temperature of the fluid in the radiator.

I also provide means whereby all or practically all of the heat rejected by the water jackets of the engine is utilized for the purpose of warming the air that is drawn through the radiator, cleaned by centrifugal force, and delivered under pressure into the car body as required, thereby providing a super-abundance of substantially clean, warmed air which can be used according to the desires of the occupants of the car.

I further provide means whereby all engine odors or noxious gases are eliminated from the passenger compartment of the vehicle by producing a slight vacuum within the engine chamber that is adapted to coact with the air pressure within the car body to cause only fresh air to enter the car body.

A further provision of the hereindescribed temperature control system relating to heating the vehicle is the means whereby all drafts may be prevented or eliminated from the car body by virtue of the fact that fresh, warmed air is introduced into the body under pressure, which provides a condition whereby no cold outside air is required, as in prior practice, to drive out exhaust gases, engine odors, or to defrost the glass windows of an ordinary closed car body by evaporation.

I still further provide a temperature control system for automotive vehicles wherein engine compartment ventilation is accomplished by means of adjustable louvers or air scoops preferably positioned to face in the direction of normal travel of the vehicle. This provision is highly desirable because during winter or low temperature operating conditions, the engine compartment may be substantially sealed, with the exception of the air leakage through the exhaust or air ejecting portion of the cooling system. This feature is especially desirable for keeping the engine warm during parking or lay-over periods.

With these and other provisions in view, the invention consists in the construction and novel combination and arrangement of parts hereinafter fully described, illustrated in the accompanying drawings, and pointed out in the claims appended hereto, it being understood that various changes in the form, proportion and minor details of construction within the scope of the claims may be resorted to without departing from the spirit of the invention or sacrificing any of the advantages thereof.

In the drawings,

Figure 1 is a view partially in section and partially in elevation of a portion of the radiator and hood of a conventional automobile having the hereindescribed temperature control system associated therewith, and Figure 2 is a cross-sectional view of the adjustable louvers shown in Figure 1.

Referring to Figure 1, an internal combustion engine 1 of the conventional automotive vehicle type is provided with a water cooling radiator 2. Water 3 is circulated through the engine 1 and the radiator 2 by means of a water pump 4 located in a conduit 5 that connects the lower part of the radiator 2 to the lower water jacket of the engine 1. The upper water jacket of the engine 1 is connected to the upper part of the radiator 2 by a connecting hose 6. The water pump 4 is driven in the usual manner by the engine 1.

The engine 1 is housed in a substantially air-tight compartment 7. Air inlet and outlet openings 8 and 9, respectively, are provided in the substantially air-tight compartment 7. As shown by Figure 1, the engine compartment 7 is separated from the body of the automobile (not shown) by a partition 10 and from the radiator 2 by a partition 11.

Immediately back of the radiator 2 a plate-like partition 12 having a central opening 13 is mounted for defining the direction of movement of the cooling air drawn through the radiator 2. A fan 14 of the centrifugal type is mounted so as to rotate in the chamber formed by the partitions 11 and 12. The fan 14 is preferably driven by the engine 1 by means of a belt 15 extending between an engine shaft pulley 16 and a pulley 17 mounted on the end of the shaft of the fan 14.

Spaced discharge openings 18 are provided for discharging air from the fan compartment 19 to the outer atmosphere. Only one of these openings is illustrated in Figure 1, they being preferably arranged on either side of the bottom of the compartment 19.

An opening 20 is also provided in the compartment 19 near the top thereof. This opening is provided with a conduit 21 for conducting fresh, warm air from the compartment 19 to the body of the automobile. The quantity of air passing through the conduit 21 is controlled by a butterfly valve 22 positioned within the conduit. The valve 22 may be adjusted by means of a finger piece 23 mounted on and extending through the partition 10 between the engine compartment and the body.

The amount of air discharged by the openings 18 is controlled by means of a butterfly valve 24 that is, in turn, operated by a thermostat 25 associated with the lower part of the radiator 2. The thermostat 25 is preferably set so that the valve 24 remains closed until the temperature of the water 3 within the radiator 2 reaches or exceeds a predetermined temperature, such, for example, as between 175 and 200 degrees Fahrenheit. At this and higher temperatures, the thermostat 25 actuates the valve 24 whereby the amount of air discharged through the openings 18 varies in accordance with the temperature of the radiator cooling liquid. At extremely high temperatures, for example, the valve 24 would be positioned so that a maximum amount of air would be discharged through the openings 18.

The openings 18 are associated with the openings 9 in the engine compartment 7 in such manner that the current of air passing out of the openings 18 creates a vacuum or reduces the pressure on the outside of the openings 9, whereby air is drawn out of the engine compartment through the openings 9. As shown in Figure 1, the conduit 26 housing the opening 18 is smaller than, and is positioned concentrically with, the conduit 27 housing the engine compartment opening 9, so that as air is discharged from the fan compartment 19 into the outer atmosphere, a vacuum is created within the conduit 27.

The air inlet openings 8 of the engine compartment 7 are preferably of rectangular shape and are covered by louvers 28 that are pivoted so as to open facing the direction of movement of the automobile. The louvers 28 may be opened and closed simultaneously by means of a connecting rod 29 that is pivoted to projections 30 extending from the inner wall of the louvers 28. The connecting rod 29 preferably extends through the partition 10 and is provided with a finger piece 31. By moving the rod 29 forwardly or backwardly, the quantity of air admitted to the openings 8 may be conveniently controlled or shut off entirely. The louvers 28 are preferably closed when the machine is left outdoors in cold weather.

The centrifugal fan 14 not only draws the proper quantity of fresh cooling air through the radiator 2 in accordance with the temperature of the radiator, but it also cleans the air, thereby providing means whereby fresh, warm air is delivered to the car body through the conduit 21 under a slight pressure.

The centrifugal fan cleans the air by throwing all foreign particles, such as dust, outwardly by centrifugal force. The entrance of the conduit 21 is located in the side of the fan chamber away from the path of the foreign particles. In this manner only clean air enters the conduit 21.

It will be appreciated that the fan 14 merely idles and thereby takes little energy from the engine 1 when all of the air discharge openings from the chamber 19 are closed. The amount of useful work done by the fan 14 depends upon the amount of air drawn through the cooling system, which amount of air is controlled by the valves 22 and 24. In case the engine becomes very hot, the fan 14 draws a very large quantity of air through the radiator 2 and thereby tends to reduce the temperature of the engine in the proper manner.

While I have illustrated the adjusting louvers 28 and the valve 22 as being controllable manually, nevertheless, it will be appreciated, and it is in my contemplation, that the louvers 28 and the valve 22 may be operated automatically by appropriate thermostats positioned within the engine compartment and the body of the automobile, respectively. It will be observed that the above described temperature control system provides means whereby a car body is heated by warmed air that is passed through a radiator wherein every portion of the radiator from top to bottom and from side to side is maintained at a temperature of between 175 and 200 degrees Fahrenheit or higher, thereby providing ideal means for warming the air for car body heating and ventilation.

The thermostatic control described above assures that the water entering the engine is of relatively high temperature as, for example, of 175 to 200 degrees Fahrenheit or higher when water alone is used as a heat transferring medium for the radiator.

The engine compartment is entirely separated from the primary radiator cooling system, but the ventilation of the engine compartment is accomplished by means of the ejector wherein the varying quantity of air passing through the radiator is controlled by the load on the engine. An air stream controlled by the temperature of the engine is the actuating medium for operating the amount of air discharged from the engine compartment.

The engine compartment ventilation is further controlled by the adjustable louvers which may be opened in extremely warm weather to keep the engine cool and which may be entirely closed in winter when the car is parked and not running.

By means of the hereindescribed temperature control system, the car body is at all times maintained in a condition of positive pressure with respect to the engine compartment. In other words, a slight pressure above atmospheric pressure in the car body and a slight vacuum in the engine compartment is maintained so that it is entirely impossible for any engine odors or dangerous gases, such as carbon monoxide, etc., to pass from the engine compartment to the passenger compartment.

The closed partition back of the radiator prevents any air circulation from the radiator into the engine compartment or vice versa. This is a particularly desirable feature during layover periods in winter, since this provision is equivalent to covering the radiator with a blanket or closing it off from excessive air circulation by means of a so-called winter front.

To prevent thermo-cycle cooling of the engine during lay-overs, a baffle 32 is provided in the radiator to retard the natural circulation of the water 3.

From the above description, it will be apparent to those skilled in the art that the hereindescribed temperature controlling system for automotive vehicles includes the following desirable features:

1. Means whereby air is drawn through the radiator in direct proportion to the quantity of air required to carry off the excess engine heat absorbed by the cooling medium.
2. A large saving of the power or energy normally required to drive the cooling fan.
3. Constant and relatively high engine temperature.
4. An almost completely sealed engine compartment which prevents uncontrolled air circulation and consequently rapid cooling off of the engine, particularly during lay-over periods in the winter season.
5. Means whereby the road dirt, dust, etc., that normally enters the engine compartment is by-passed through an ejecting apparatus that is arranged to exhaust the air induced through the radiator under the car to thereby obtain a high degree of cleanliness in the engine compartment.
6. Means whereby a large volume of fresh, warm air under control is delivered to the body for heating and ventilating purposes.
7. A combination temperature control system for the engine and body of a conventional automotive vehicle.

It will be apparent to those skilled in the art that, while I have illustrated and described the invention in connection with a specific modification, it may be otherwise utilized without departing from the spirit of the present invention or the scope of the following claims.

I claim:
1. A temperature control system for automobiles comprising a body, an engine, an enclosed compartment for said engine having an opening therein, a liquid cooling system for the engine including a radiator, a sealed cover associated with one side of said radiator having spaced openings therein, a centrifugal fan in said cover for drawing cooling air through said radiator, into said cover and out of said openings, valves in said openings for controlling the quantity of air discharged therethrough, a thermostat associated with the radiator for operating one of said valves, means whereby the passage of air discharged by one of the openings decreases the pressure on the outside of the opening in said engine compartment, thereby tending to create an air draft outwardly through the compartment opening, a conduit for conducting the air discharged from one of the radiator-cover air discharge openings to the body, and adjustable louvers associated with the enclosed engine compartment.

2. A temperature control system for automobiles comprising a body, an engine and a radiator for cooling said engine, substantially air-tight compartments separating said body, engine and radiator from each other, said radiator compartment having an opening whereby fresh cooling air may be drawn through said radiator and having a plurality of spaced air discharge openings, a centrifugal fan for drawing air through the radiator opening, into the radiator compartment and discharging it out of said discharge openings, said fan cleaning the air of foreign matter, said engine compartment having air inlet and outlet openings, means whereby the passage of air out of one of the radiator-compartment-air-discharge openings creates a reduced pressure at the outlet opening of the engine compartment, means whereby air is conducted from one of the radiator-air-discharge openings to the body compartment, and means controlling the quantity of air passing through any of the air-openings.

3. A temperature control system comprising an engine, a radiator for cooling the engine, a substantially air-tight compartment for the engine having air inlet and outlet passages, a cooling system for the radiator including means for creating an air draft through the radiator and adjacent the outlet opening of the engine compartment to thereby reduce the air pressure on one side of said opening, and means for controlling the passage of air into said engine compartment including adjustable louvers associated with the engine-compartment-air inlet openings.

4. A temperature control system comprising an engine, a fluid-radiator for cooling the engine, means including a cover having only a single restricted opening whereby cooling air is drawn through the radiator and discharged through the restricted opening, a valve in said opening controlling the quantity of air discharged, and a thermostat associated with the radiator for controlling said valve, said thermostat being adjusted to maintain the temperature of the radiator fluid at, at least, approximately 175° Fahrenheit.

5. A temperature control system for automotive vehicles comprising separate engine and radiator compartments having contiguous air discharge openings, means for forcing air from the radiator out of one of the openings to thereby create a reduced pressure on the outside of the other opening.

6. A temperature control system for automotive vehicles comprising separate air compartments for the engine and its radiator, said compartments having restricted air-discharge openings arranged with respect to each other so that a current of air discharged under pressure from one of said openings creates a reduction of pressure on one side of the other opening tending to pull the air through that opening out of its compartment.

7. A temperature control system for automotive vehicles comprising separate air compartments for the engine and its radiator, said compartments having restricted air-discharge openings arranged with respect to each other so that a current of air discharged under pressure from one of said openings creates a reduction of pressure on one side of the other opening tending to pull the air through that opening out of its compartment, and means for controlling the quantity of air passing through said openings in accordance with the temperature of said radiator.

8. A temperature control system for automotive vehicles comprising separate air compartments for the engine and its radiator, said compartments having restricted air discharge openings arranged with respect to each other so that a current of air discharged under pressure from one of said openings creates a reduction of pressure on one side of the other opening tending to pull the air through that opening out of its compartment, and means for controlling the quantity of air passing through said openings in accordance with the temperature of said radiator above a temperature of between 175° and 200° Fahrenheit.

9. A temperature control system for automotive vehicles including an engine, a radiator for the engine, an enclosed compartment for the engine having restricted air inlet and outlet openings, means creating a suction on the outside of the air outlet openings, and means for changing the quantity of air admitted to the air inlet openings.

10. A temperature control system for automotive vehicles including an engine, a radiator for the engine, an enclosed compartment for the engine having restricted air inlet and outlet openings, means creating a suction on the outside of the air outlet openings, means automatically controlling the magnitude of said suction, and means for changing the quantity of air admitted to the air inlet openings.

11. A temperature control system for automotive vehicles including an engine, a radiator for the engine, an enclosed compartment for the engine having restricted air inlet and outlet openings, means including a draft of the radiator cooling air for creating a suction on the outside of the air outlet openings, means automatically controlling the magnitude of said suction, and means for changing the quantity of air admitted to the air inlet openings, in accordance with the temperature of the radiator above 175° Fahrenheit.

12. A temperature control system for an engine cooled by a radiator comprising a thermostat associated with the radiator, means for drawing cooling air through said radiator exclusively, said means having only a single restricted opening for discharging said air and a valve associated with the opening controlled by said thermostat for changing the amount of air discharged in accordance with the temperature of said radiator.

13. A temperature control system for an engine cooled by a radiator comprising a thermostat associated with the radiator, means for drawing cooling air through said radiator exclusively, said means having only a single restricted opening for discharging said air and a valve associated with the opening controlled by said thermostat for changing the amount of air discharged in accordance with the temperature of said radiator, said valve being kept closed at temperatures of said radiator below 175° Fahrenheit.

In testimony whereof I have hereunto set my hand.

CHRISTIAN H. KENNEWEG.